United States Patent
Lee et al.

(10) Patent No.: US 9,548,936 B2
(45) Date of Patent: Jan. 17, 2017

(54) METHOD AND SYSTEM FOR IMPROVED TCP PERFORMANCE OVER MOBILE DATA NETWORKS

(75) Inventors: Jack Yiu Bun Lee, Kowloon (CN); Ke Liu, Beijing (CN)

(73) Assignee: The Chinese University of Hong Kong, Shatin, New Territories, Hong Kong (CN)

( * ) Notice: Subject to any disclaimer, the term of this patent is extended or adjusted under 35 U.S.C. 154(b) by 229 days.

(21) Appl. No.: 13/530,515

(22) Filed: Jun. 22, 2012

(65) Prior Publication Data

US 2013/0163428 A1    Jun. 27, 2013

Related U.S. Application Data

(60) Provisional application No. 61/503,251, filed on Jun. 30, 2011.

(51) Int. Cl.
| | | |
|---|---|---|
| *H04L 12/26* | (2006.01) | |
| *H04L 12/841* | (2013.01) | |
| *H04W 28/02* | (2009.01) | |
| *H04L 12/801* | (2013.01) | |
| *H04L 12/807* | (2013.01) | |

(52) U.S. Cl.
CPC .......... *H04L 47/28* (2013.01); *H04W 28/0289* (2013.01); *H04L 47/14* (2013.01); *H04L 47/193* (2013.01); *H04L 47/27* (2013.01)

(58) Field of Classification Search
CPC .......... H04L 47/10; H04L 47/14; H04L 47/27; H04L 47/193; H04L 47/28; H04W 80/06; H04W 28/04; H04W 80/04; H04W 28/18; H04W 28/0289
USPC ......... 370/237–238, 252, 310, 328, 230–235
See application file for complete search history.

(56) References Cited

U.S. PATENT DOCUMENTS

| | | | | |
|---|---|---|---|---|
| 7,283,474 | B1 * | 10/2007 | Bergenwall | 370/235 |
| 2003/0117974 | A1 * | 6/2003 | Kang | 370/328 |
| 2003/0179720 | A1 * | 9/2003 | Cuny | 370/310 |
| 2005/0041582 | A1 * | 2/2005 | Hancock et al. | 370/231 |
| 2006/0209838 | A1 * | 9/2006 | Jung et al. | 370/394 |
| 2007/0025250 | A1 * | 2/2007 | Shimonishi et al. | 370/231 |

(Continued)

FOREIGN PATENT DOCUMENTS

| | | |
|---|---|---|
| CN | 1790972 A | 6/2006 |
| CN | 101184052 A | 5/2008 |
| CN | 101645765 A | 2/2010 |

OTHER PUBLICATIONS

International Search Report and Written Opinion of the International Searching Authority for PCT Application No. PCT/CN2012/077916, mailed on Oct. 4, 2012, 9 pages.
Allman et al., TCP Congestion Control, Network Working Group, RFC 2581, The Internet Society, Apr. 1999, 14 pages.
Balakrishnan et al., A Comparison of Mechanisms for Improving TCP Performance over Wireless Links, to appear, Proc. ACM SIGCOMM, Stanford CA, Aug. 1996, 14 pages.

(Continued)

*Primary Examiner* — Kwang B Yao
*Assistant Examiner* — Harun Chowdhury
(74) *Attorney, Agent, or Firm* — Kilpatrick Townsend & Stockton LLP; Kenneth R. Allen

(57) ABSTRACT

Performance of transport protocols over a mobile data network is improved by a mobile accelerator, which performs protocol optimizations on-the-fly without requiring any modification to server or client protocol implementations in the operating systems of the server or client. The proposed mobile accelerator is compatible with existing TCP protocol implementations at the server and the client device, without server/client OS modification.

10 Claims, 4 Drawing Sheets

(56) References Cited

U.S. PATENT DOCUMENTS

| | | | | |
|---|---|---|---|---|
| 2009/0300211 A1* | 12/2009 | Gallagher | ............... | H04L 47/10 709/235 |
| 2011/0059691 A1* | 3/2011 | Hegge | ......................... | 455/11.1 |
| 2013/0021928 A1* | 1/2013 | Weill et al. | .................. | 370/252 |

OTHER PUBLICATIONS

Fu et al., TCP Veno: TCP Enhancement for Transmission Over Wireless Access Networks, IEEE Journal on Selected Areas in Communications, vol. 21 No. 2, Feb. 2003, pp. 216-228.

Floyd et al., The NewReno Modification to TCP's Fast Recovery Algorithm, Network Working Group, RFC 2582, The Internet Society, Apr. 1999, 12 pages.

Jacobson et al., TCP Extensions for High Performance, Network Working Group, RFC 1323, The Internet Society, May 1992, 37 pages.

Lee et al., TCP-SuperCharger: A New Approach to High-Throughput Satellite Data Transfer, Department of Information Engineering, The Chinese University of Hong Kong, Hong Kong, 2009 J-13, 7 pages.

Mascolo et al., TCP Westwood: Bandwidth Estimation for Enhancement Transport over Wireless Links, ACM ISBN 1-58113-422-3/01/07, 2001, pp. 287-297.

Rhee et al., CUBIC: A New TCP-Friendly High-Speed TCP Variant, no date available, 6 pages.

Technical White Paper, Long Term Evolution (LTE): A Technical Overview, Motorola, Inc., 15 pages.

* cited by examiner

METHOD AND SYSTEM FOR IMPROVED TCP PERFORMANCE OVER MOBILE DATA NETWORKS

CROSS-REFERENCES TO RELATED APPLICATIONS

The present application claims benefit under 35 USC 119(e) of U.S. provisional Application No. 61/503,251, filed on Jun. 30, 2011, entitled "METHOD AND SYSTEM FOR IMPROVED TCP PERFORMANCE OVER MOBILE DATA NETWORKS," the content of which is incorporated herein by reference in its entirety.

STATEMENT AS TO RIGHTS TO INVENTIONS MADE UNDER FEDERALLY SPONSORED RESEARCH AND DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

This invention relates to mobile telecommunication and particularly to mobile data systems employing TCP protocols.

Mobile Internet devices such as smartphones and netbooks appear to be a major stage in the evolution of the Internet. Unlike conventional desktop computers these mobile devices are often connected to the Internet via wireless links such as WiFi and 3G [1] data networks. In particular, the growth of 3G user population has been increasing rapidly in recent years and it is expected that the number of Internet users connected wirelessly will soon exceed their wired counterparts.

Despite the rapid developments in mobile Internet, much of the Internet infrastructure, most notably the transport protocols such as TCP and UDP, is still rooted in wired networks invented decades ago. While the Internet transport protocols are compatible with and will work in mobile data networks, their performance in practice is often sub-optimal. According to our own experiments conducted in production mobile data networks, we found that mobile data networks such as 3G/HSPA and LTE [2], although is IP-based, exhibit substantial differences in their characteristics which prevent existing Internet transport protocols from performing optimally.

For example, in one experiment a 15 MB file was downloaded from a wired-network-connected Linux web server over a 3G/HSPA modem to a notebook computer running a web browser. The 3G (third generation mobile) network in the experiment supports high speed packet access (HSPA) which has a theoretical maximum downlink bandwidth of 7.2 Mbps. Surprisingly the achievable average download throughput, indicated by the lower curve in FIG. 1, is only ~1.5 Mbps, which is far lower than the theoretical maximum even accounting for protocol overheads. In the same figure we also plot the goodput of a UDP data flow using the same network and 3G/HSPA modem setup. In this case UDP can achieve an average goodput of ~5.5 Mbps, which is much closer to the theoretical limit. These results clearly show that the existing TCP implementation failed to fully utilize the bandwidth available in the mobile data network.

As hereinafter explained, this invention addresses this performance problem of running TCP over mobile data networks. Measurements in production mobile data networks including 3G/HSPA and LTE found that modern mobile data networks differ from wired networks in three important ways: (a) larger roundtrip time (RTT), generically reception timings, compared to wired networks; (b) non-congestion-related packet loss; and (c) rapid bandwidth fluctuations. More importantly, these differences render many of the assumptions in existing TCP implementations no longer valid, and as a result, degrade their performance in mobile data networks significantly.

One approach to tackle these challenges is to modify or redesign TCP for use in mobile data networks. While this approach is sound in principle it presents significant difficulties in practical deployment. Specifically, transport protocols are often implemented as part of the operating system (OS). Thus to deploy a new TCP variant it will be necessary to replace or to upgrade the corresponding OS components. This is a significant hurdle as there are many different OS implementations in use in Internet servers, ranging from open source implementations (e.g., Linux and its many variants) to proprietary implementations (e.g., various versions of Microsoft Windows). Moreover, given the large number of servers already deployed across the Internet, such protocol upgrade will have to be carried out progressively and thus would take a long time to materialize.

A more subtle yet critical problem is that many of these servers will be serving users from both wired networks and mobile data networks. Thus any protocol updates will either need to work well for both wired and mobile data network users, or be able to distinguish the two types of users so that the proper protocol optimizations can be applied. Neither of these two problems is trivial and further research is required before the feasibility and performance of this approach can be ascertained.

At the other end of the connection is the user's mobile device. Unlike desktop computers, there are significantly more varieties of OS for mobile devices, such as Palm, Symbian, iPhone OS, BlackBerry OS, Android, Windows Mobiles, etc. Therefore deploying protocol upgrades will not be a straightforward exercise. Even if the protocol implementation in the client device can be modified, TCP's performance is still constrained by its congestion control algorithm, which is implemented at the sender-side (i.e., server for most applications).

Upgrading protocol implementations is difficult and costly. Moreover, the need to maintain compatibility with existing transport protocols at both ends of the connection prevents implementation of various solutions, e.g., any solution requiring the addition of new TCP header fields or new protocol handshakes will not be applicable.

SUMMARY

According to the invention. performance of transport protocols over a mobile data network is improved by a mobile accelerator which performs protocol optimizations on-the-fly without requiring any modification to server or client protocol implementations in the Operating Systems of the server or client. The mobile accelerator is compatible with existing TCP protocol implementations at the server and the client device, thus eliminating the need for server/client OS modification completely.

DETAILED DESCRIPTION

Figure 1:
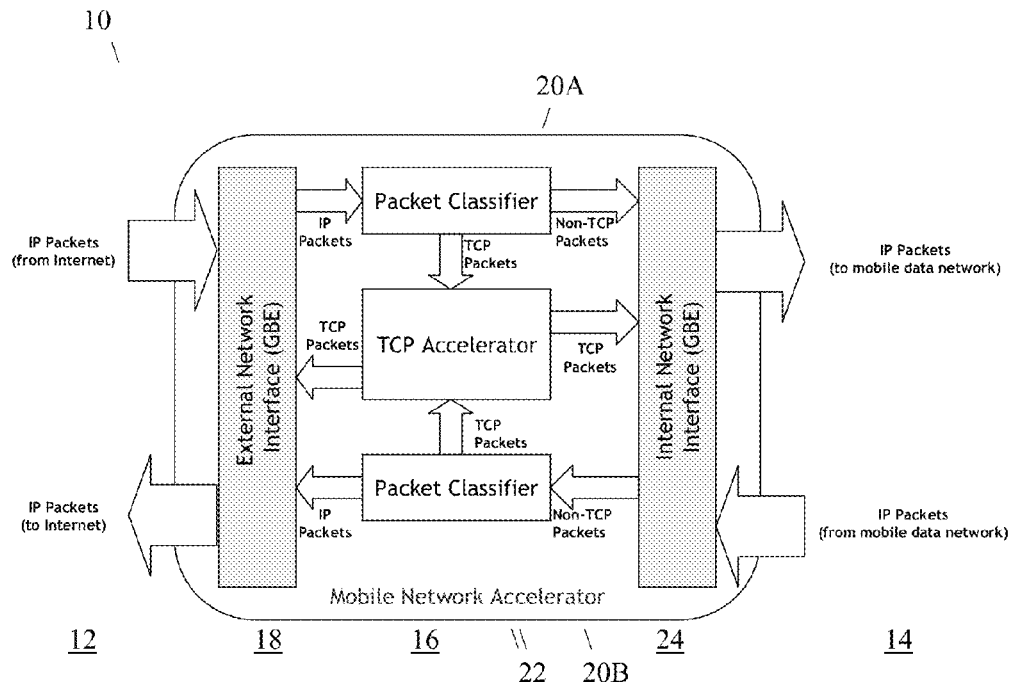
FIG. 1 is a functional block diagram of an architecture of a network-centric mobile accelerator according to the invention.

Referring to FIG. 1, an example of a network-centric architecture is shown that incorporates the invention. Other configurations are possible as will be evident to those of skill in the art. A system 10 encompasses the Internet 12 and a mobile data network 14 interconnected by a mobile network accelerator 16 according to the invention. The mobile network accelerator 16 has one or more external network interfaces 18 for receiving IP packets from the Internet 12 and for sending IP packets to the mobile data network 14, either generated by the mobile network accelerator 16 or otherwise from the mobile data network 14. The mobile network accelerator 16 also has one or more internal network interfaces 24 for receiving IP packets from the mobile data network 14 and for sending IP packets either generated by the mobile network accelerator 22 or from the Internet 12. The mobile network accelerator 16 incorporates a TCP accelerator module 22 as hereinafter explained. A first packet classifier 20A separates TCP packets and non-TCP packets. A second packet classifier separates TCP packets from IP packets. The TCP acceleration module 22 receives TCP packets from the packet classifiers 20A and 20B and processes them according to the invention as hereinafter explained. Non-TCP packets from the external/internal network interfaces 18, 24 may simply be forwarded to the internal/external network interface 24, 18 unchanged to make the mobile network accelerator transparent to non-TCP traffic. The mobile network accelerator 16 can be deployed in the mobile data network 14 such that all mobile data traffic will route through and be optimized by the 16 accelerator as shown in FIG. 1. There is no need to modify the operating system of either a client mobile device (cell phone) or the server host system with which it is in communication.

Figure 6:
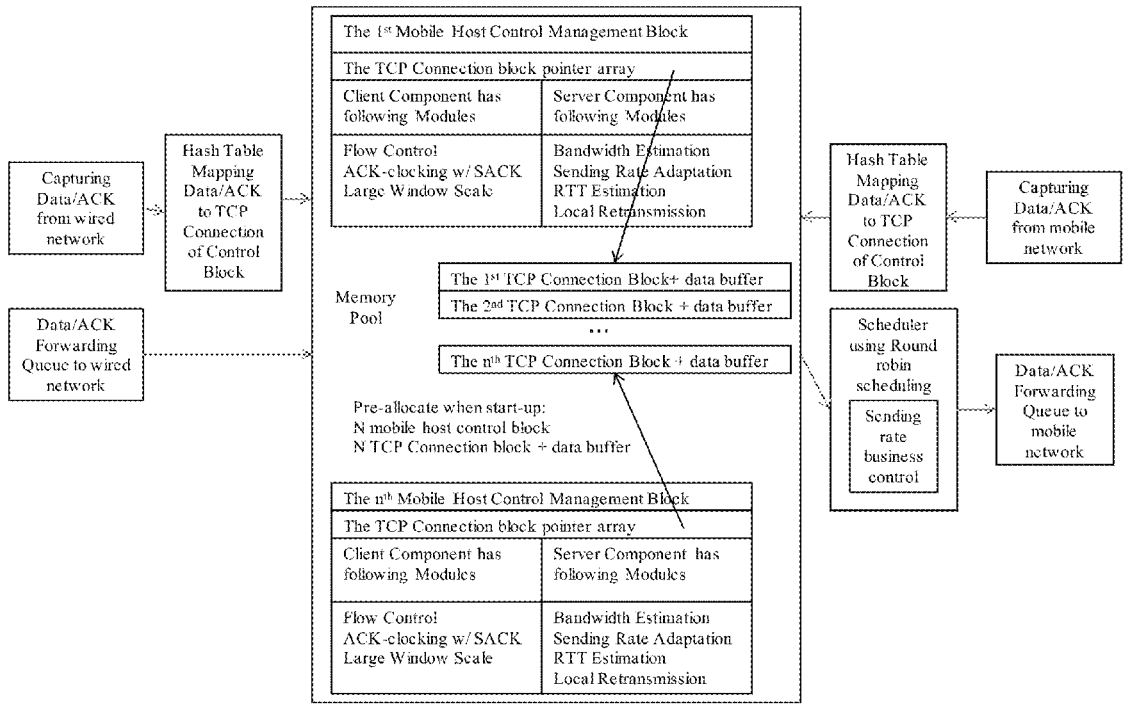
FIG. 6 is a functional block diagram corresponding to the TCP accelerator of FIG. 1

FIG. 6 is a block diagram of the TCP accelerator 16 of FIG. 1. Its function is explained in greater detail upon reference to the pseudo code herein below.

In order to understand aspects of the invention, it is helpful to consider the state of the art in connection with the following detailed description of the invention. As the deployment of the invention is done by the network operator only, mobile data traffic needs to be processed. The normal operation of the wired Internet from Internet servers to the mobile operator is unaffected by the invention and can continue to operate using the existing transport protocols, thereby ensuring fairness to other Internet traffic.

The Flow Control Bottleneck

TCP throughput is affected by a number of factors, most notably the link capacity, the round-trip-time (RTT), packet loss rate, and competing traffic. The following section describes the characteristics of RTT or reception timings in mobile data networks and their impact on TCP performance.

Round-Trip-Time

In tests, a measurement tool was used to send UDP datagrams from a wired-network sender to a receiver connected via a modem, such as a 3G/HSPA modem, at controlled data rates in order to measure round-trip time (RTT). When eight sending rates ranging from 0.8 Mbps to 6.4 Mbps were tested, the corresponding average RTT and packet loss rate were measured as summarized in Table 1.

TABLE 1

Average RTT and packet loss rate at different UDP data flow sending rates

| | Sending rate (Mbps) | | | | | | | |
|---|---|---|---|---|---|---|---|---|
| | 0.8 | 1.6 | 2.4 | 3.2 | 4.0 | 4.8 | 5.6 | 6.4 |
| Average RTT (ms) | 62 | 69 | 68 | 84 | 287 | 792 | 753 | 679 |
| Loss (%) | 0.02 | 0.01 | 0.32 | 0.14 | 1.9 | 27.1 | 26.5 | 35.4 |

At lower sending rates, e.g., below 4 Mbps, it was observed that the mean RTT stayed within 100 ms. However as both the sender and the receiver were located in the same region (i.e., without traversing inter-city or international links) the RTT was still significantly longer than its wired counterpart, which typically measured below 10 ms.

It has been observed that the RTT increases significantly when the sending rate approaches the link capacity. In tests at 4 Mbps, the mean RTT was observed to increase to 287 ms although the network was able to sustain the UDP data flow at this data rate. Again the increases in the RTT were largely queuing time when the server and the client were both local.

It has been observed that long RTT increases the network bandwidth-delay-product (BDP) significantly. For example, at 4 Mbps with an RTT of 287 ms, it was observed in tests that the resultant BDP was 143.5 KB. In a known current LTE network, the BDP can become as large as 769.5 KB.

In networks with large BDP, the performance of TCP is limited in two ways. First, if the BDP is larger than TCP's transmission window size, then the link will be underutilized due to idling periods in waiting for acknowledgement packets to return. This is a known problem in high-speed networks and thus a TCP extension has been developed called the Large Window Scale (LWS) option defined in RFC1323 [3] specifically designed to address this problem. However, as demonstrated by Wan and Lee [4] in their study of TCP performance over satellite links, the LWS option is rarely activated in practice as there is no standard way to activate the option by the network application. Instead almost all network applications tested, ranging from FTP clients to web browsers, have adopted the default window size settings.

In known implementations, the default receiver window size is operating-system dependent. In Windows XP for example, it is a merely 17 KB. Compared to the previously measured BDPs at 143.5 KB for 3G/HSPA networks and 769.5 KB for LTE networks, this receiver window size is clearly much too small. Although one can modify the existing operating system to use a sufficiently large receiver window size in TCP, the resultant memory requirement may become a problem for applications that make use of large number of sockets (e.g., P2P applications) or for mobile devices with very limited physical memory. Surprisingly, with the network-centric approach, it is possible to enlarge the receiver window size virtually without the additional memory cost.

Opportunistic Transmission

A receiver window is employed in the conventional TCP flow control mechanism that was designed to prevent fast senders from overwhelming slow receivers, leading to receiver buffer overflow. However, the processing capacity of computers has progressed significantly so that ordinary personal computers can easily process incoming data at rates measured in tens of Mbps. For example, in measurements of the receiver window size in TCP ACK packets when transferring data in a mobile data network or even in a wired network, the reported receiver window size stayed at the maximum level (e.g., at the default size of 17 KB) nearly all the time. This implies that packets arriving at the receiver were quickly processed and passed to the application even before the next packet arrives, thus leaving the receiver buffer nearly empty at all times.

Thus according to the invention, a new opportunistic transmission scheme has been developed that takes advantage of a contemporary receiver's processing power to eliminate the need for a large receiver buffer. Specifically, in operation the mobile accelerator 16 divides the TCP flow between the server and the mobile client into two segments: a wired segment linking the wired sender to the mobile accelerator, and a wireless segment linking the mobile accelerator to the wireless receiver.

On the wired segment the mobile accelerator 16 buffers incoming TCP segments from the server and returns TCP ACKs immediately. More importantly, the receiver window size reported in the ACKs is determined by the buffer availability at the mobile accelerator 16 rather than at the mobile client. Where the accelerator 16 runs in a computer with abundant memory, the reported window size (e.g., 2 MB) can be much larger than the one reported by the mobile device.

On the wireless segment, the mobile accelerator forwards the buffered TCP segments to the receiver. Normally a TCP sender will not send more data than the client's reported receiver window size but in the mobile accelerator, packet forwarding is primarily controlled by a rate-based congestion control algorithm discussed in the next section. Unless the reported receiver window size is zero—in which case the accelerator will suspend packet forwarding—the accelerator will forward the buffered TCP segments to the mobile client irrespective of the receiver window size. This is what is herein termed opportunistic transmission. In practice this means the accelerator will frequently transmit far more packets than the receiver window size would allow.

The proposed mobile accelerator is similar to split-TCP [10] in splitting a TCP flow into two segments. However split-TCP employed conventional TCP for both segments and thus can only achieve performance gains from shortening the RTT of the two segments and suppressing loss events in the wireless networks. By contrast, the present mobile accelerator employs completely different flow and congestion control algorithms that incorporate the characteristics of modern computers and mobile data networks to achieve substantially higher performance gains in the mobile segment.

Figure 2:
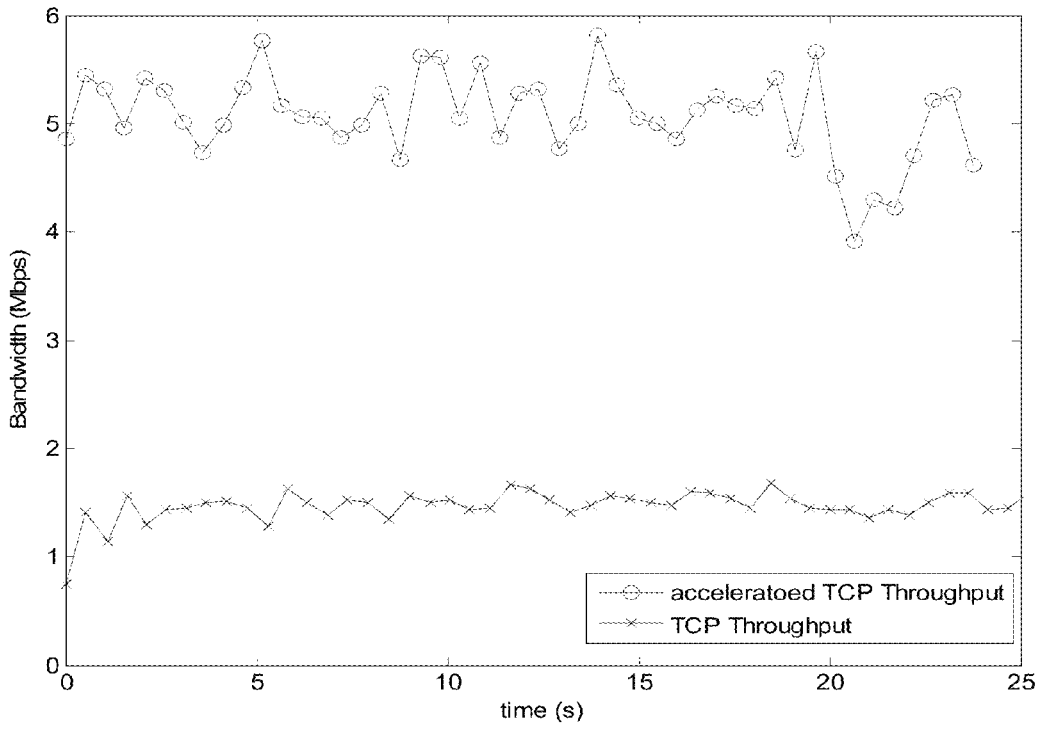
FIG. 2 is a graph comparing conventional TCP flow and accelerated TCP flow.

FIG. 2 compares the throughput of conventional TCP (TCP Cubic [5]) and the same TCP flow accelerated by opportunistic transmission. For sake of comparison the mobile accelerator transmit at a fixed maximum rate of 5.6 Mbps irrespective of the receiver window size as long as it is non-zero. The results clearly show that with opportunistic transmission the accelerated TCP flow can achieve significantly higher throughput (5 Mbps) than conventional TCP even though the maximum receiver window size is the same, 17 KB in both cases. Nevertheless, forwarding data at a fixed maximum rate may not always work well as wireless bandwidth can and does fluctuate from time to time. A rate-based congestion control algorithm in the next section addresses this problem.

Congestion Control Bottleneck

In wired networks, packet losses are conventionally considered as an indication of network congestion. However, this assumption may not always be valid in mobile data networks, as some packet losses may not be caused by network congestion. Besides congestion-induced packet loss, mobile data networks may also exhibit packet loss due to other factors such as wireless signal degradation.

Figure 3:
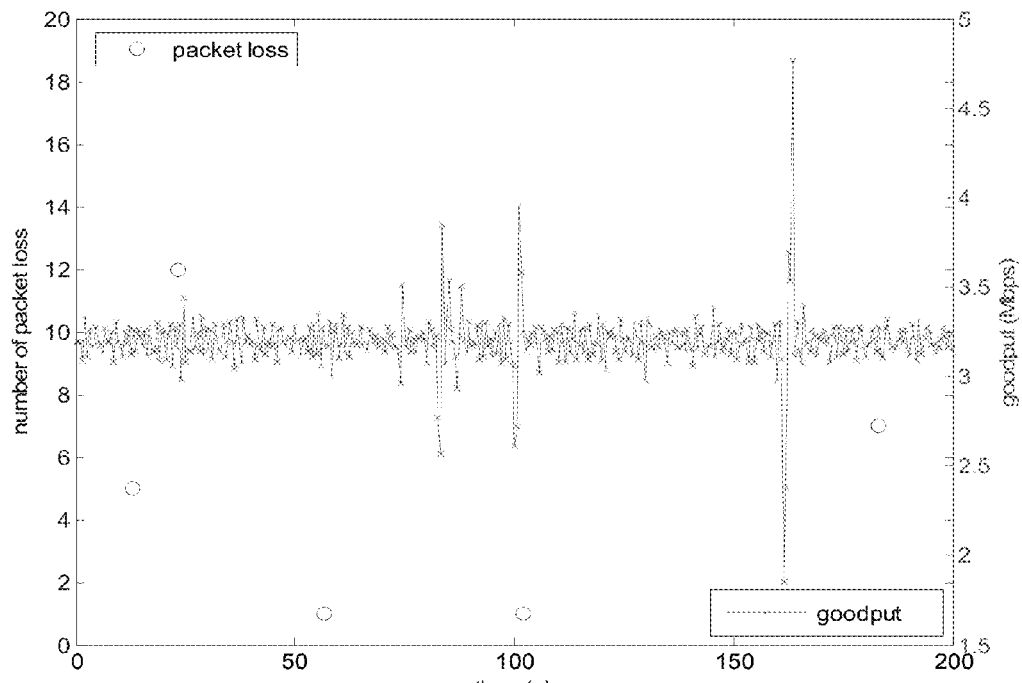
FIG. 3 is a graph illustrating packet loss and goodput.

To illustrate this, UDP datagrams were transmitted at a fixed rate of 3.2 Mbps and a plot the 500-ms averaged goodput and packet loss events was made as shown in FIG. 3. For each loss event, the number represents the number of consecutive packets lost in the burst. One key observation from this result is that the loss events do not closely correlate with variations in the traffic goodput. This strongly suggests that some of the loss events are not due to network congestion. This characteristic of mobile data networks may confuse a conventional TCP congestion control algorithm, leading to unnecessary reduction of the congestion window size (CWnd), and thus the achievable throughput.

For example, TCP Reno [2-3] reduces the CWnd by half during fast recovery, leading to a substantial reduction in the transmission rate. Even after fast recovery is completed, TCP will only grow the CWnd additively, which will take considerable time before it can resume the transmission rate to normal. By contrast, the results shown in FIG. 4 clearly show that the available bandwidth in many cases did not degrade at all even after packet loss events. Thus the conventional TCP congestion control will likely underutilize the bandwidth available.

Recent TCP variants such as TCP Cubic [4] may perform better in these scenarios as it has a smaller CWnd reduction factor (0.2 versus 0.5), and it grows the CWnd more aggressively using a Cubic function. Nevertheless its congestion control algorithm will still be triggered by non-congestion losses and suffer from throughput degradations.

To quantify this, let $r_i$ be the average throughput of the traffic flow in time interval i. Assume there are k packet loss events, and the $j^{th}$ loss event occurs in time interval $h_j$, then we define the throughput loss, denoted by $l_x$, as $$l_x = [r_{h_j-1} - r_{h_j}] / r_{h_j-1} \qquad (1)$$

which measures the ratio of throughput loss after a packet loss event. The average throughput loss, denoted by L, over the entire experiment is computed from:

$$L = E[l_x | \forall x \in 0, 1, \ldots k-1] \qquad (2)$$

Using this metric, the computed average throughput loss for TCP Reno, TCP Cubic, and the UDP flow are 91%, 85.3% and 12.8% respectively. Thus it is clear that the loss events induced substantially more degradation in throughput than the actual bandwidth available. By contrast, the present invention decouples loss recovery from transmission rate control in the mobile accelerator 16.

A number of previous works [7-9] have investigated this problem and proposed various algorithms to differentiate random packet loss from congestion-induced packet loss. However, none of these studies were evaluated in modern mobile data networks such as 3G/HSPA and LTE, and thus further investigation is needed to validate and evaluate their performance in modern mobile data networks.

Packet Loss Recovery

Packet loss recovery has two parts. The first part recovers packet loss occurring between the TCP sender and the accelerator, and the second part recovers packet loss between the accelerator and the receiver.

For the first part, the loss recovery algorithm is similar to conventional TCP, i.e., via duplicate ACKs when packet loss occur. It operates independently from the second part where the accelerator performs retransmission locally. Specifically, the mobile accelerator maintains a list of unacknowledged TCP segments. When three duplicate ACKs are received, the accelerator retransmits the lost TCP segment and suppresses the duplicate ACK, i.e., not forwarding it back to the TCP sender, if the requested lost TCP segment is available in the accelerator.

Otherwise, the TCP segment is lost in the path from the TCP sender to the accelerator, and in this case the duplicate ACKs will be forwarded to the TCP sender for retransmission. In all cases, packet loss events do not affect the rate at which packets are forwarded by the accelerator to the receiver, thus decoupling packet loss recovery from congestion control.

Rate-Based Congestion Control Algorithm

Congestion in mobile data networks differs fundamentally from congestion in wired networks, as each mobile device is allocated a separate network channel that has no other competing traffic. However mobile devices sharing the same cell may still compete for wireless resources, subject to the dynamic resource allocation algorithm implemented in the base station. In addition, bandwidth availability is also affected by the radio signal quality. Experiments showed that the fluctuations can be very rapid and unpredictable.

Figure 5:
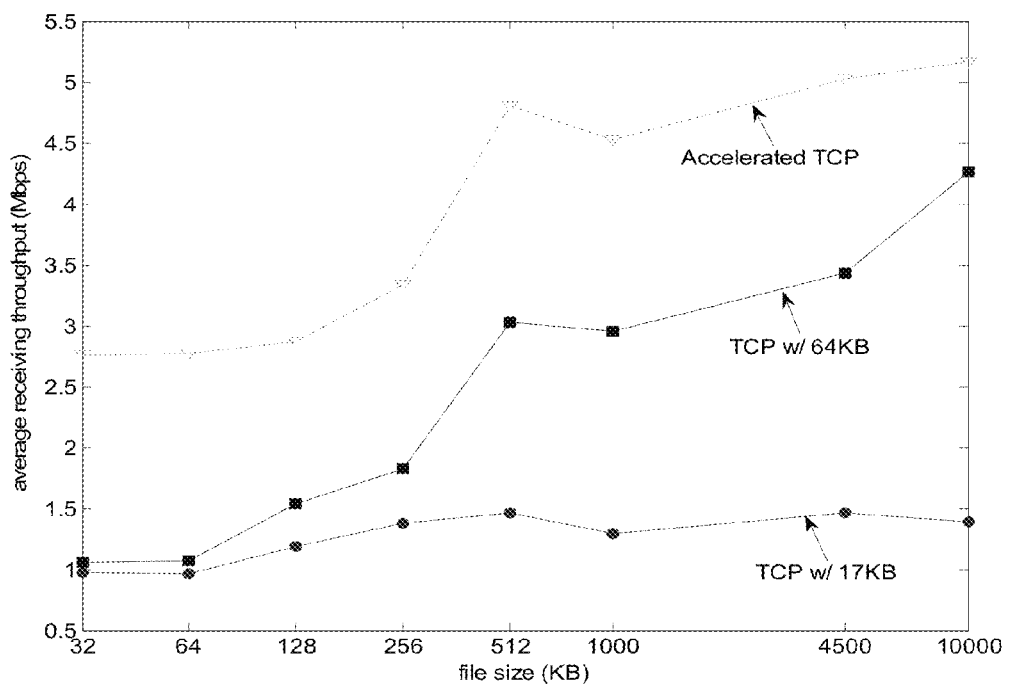
FIG. 5 is a graph illustrating accelerated TCP throughput and conventional TCP throughput at various file sizes.

Investigations revealed that RTT does correlate with bandwidth availability and hence can be used in the rate-based congestion control algorithm. To illustrate the correlation, an experiment was conducted to transmit UDP data over a 3G/HSPA network at a fixed data rate of 4 Mbps. The receiver returned an ACK for every UDP datagram received so that the sender can measure the RTT. FIG. 5 plots the UDP goodput and RTT measured by the receiver and sender respectively. It is clear that throughput and RTT are highly correlated. This correlation is consistent in experiments, thus leading to employment of RTT for congestion control.

The inventive rate-based congestion control algorithm has two components: bandwidth estimation and bandwidth adaptation. The accelerator performs an accelerator-to-receiver estimate of the available bandwidth by measuring the average rate of returning ACKs. Specifically, let $t_i$ be the arrival time of ACK i with acknowledged sequence number $ack_i$. Then for a positive integer k, the estimated receiving bandwidth, denoted by $R_i$, is computed from:

$$R_i = \frac{ack_{i+k} - ack_i}{t_{i+k} - t_i} \quad (3)$$

where the numerator is the amount of data received by the receiver during the time interval $(t_i, t_{i+k})$. The parameter k controls the duration of the estimation interval (in number of ACKs) and can be adjusted to tradeoff between accuracy and timeliness of rate estimation. The computed $R_i$'s are further smoothed by applying exponentially weighted moving averaging to obtain the estimated bandwidth R:

$$R = (1-\lambda) \times R + \lambda \times R_i \quad (4)$$

where $\lambda$ is the smoothing factor.

Bandwidth adaptation is triggered by two RTT thresholds $\alpha$ and $\beta$, $\alpha < \beta$, and controlled by a transmission rate limit $R_{max}$. If the measured RTT exceeds $\beta$, then the accelerator will trigger congestion avoidance and set $R_{max}$ to the estimated bandwidth R according to (4). If the measured RTT is less than $\alpha$, then the network is not congested and the accelerator will increase $R_{max}$ according to:

$$R_{max} = \mu \times R_{max} + (1-\mu) \times R_{cap} \quad (5)$$

where $R_{cap}$ is the link capacity of the mobile data network. Note that Eq. (5) will not increase the transmission rate limit beyond the mobile data network's link capacity, which is known to the mobile accelerator. This can avoid the periodic congestions caused by conventional TCP's bandwidth probing actions.

The parameter $\mu$ ranges from 0 and 1, and is used to control the rate of transmission rate increase. Unlike conventional TCP, which the rate increase is gradual to maintain fair bandwidth sharing with competing flows, the accelerator can increase the transmission rate more aggressively to improve bandwidth utilization. Fairness among TCP flows sharing the same radio network channel, i.e., TCP flows destined to the same mobile device, can be maintained by the accelerator using round-robin transmission scheduling.

In addition to network bandwidth constraint, in some cases the achievable throughput may also be limited by the mobile device's processing capacity. This is especially the case in mobile handsets. As the bandwidth estimation algorithm is based on ACKs returned by the receiver, it inherently accounts for the receiver's processing limit in case it is the bottleneck. Importantly the processing is done independently on a per flow basis and thus its complexity increases only linearly with the number of flows in the system.

Pseudo Code for System

Figure 7:
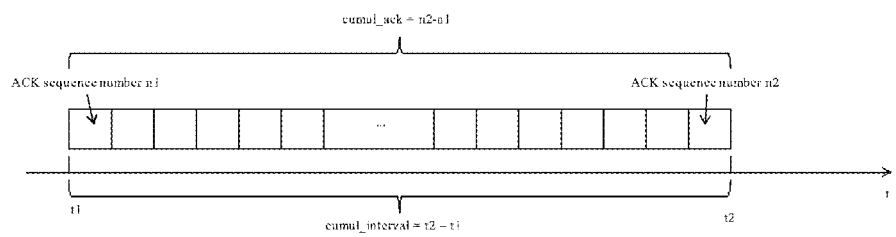
FIG. 7 is a diagram for illustrating sliding window average bandwidth estimation.

The following paragraphs present the pseudo code for the various components of the system herein described. Reference is made to FIG. 7 for illustration of the interrelationship of the recited procedures.

```
PROCEDURE Capturing Data/ACK from wired network
    While receiving a packet
        /*determine which TCP block and mobile host control
        block it belongs*/
        if it is a TCP packet
            PROCEDURE Hash table mapping Data/ACK to
    TCP connection of Control block
            else
                PROCEDURE Data/ACK Forwarding queue to
                mobile network
END PROCEDURE
```

```
PROCEDURE Data/ACK Forwarding queue to wired network
    While forwarding queue is not empty
        If it is a TCP packet
            /*denote the sending time of this packet for the
    purpose of estimation of RTT */
            packet.send_time = current_time
        Transmit this packet
END PROCEDURE
```

```
PROCEDURE Hash table mapping TCP packet to TCP
Connection Block of Control Block
    Receiving an packet whose flag has SYN
        /* allocate a mobile host control block using IP as key,
return
a hash table index for that mobile host */
        host_index = Allocate_mobile_host_control_block(IP,
            memory_pool) ;
        /* allocate a TCP connection block and data buffer using IP
    and Port as key, it returns a has table index for that TCP
    connection*/
        TCP_index =
Allocate_TCP_connection_block_data_buffer(IP,
Port, memory_pool)
    Receiving an packet whose flag has ACK
        /*mapping to the corresponding mobile host control block, return
a hash table index for that mobile h*/
        host_index = map_mobile_host_control_block(IP, memory_pool)
        /*mapping to the corresponding TCP connection block, return a
hash table index for that TCP connection*/
        TCP_index = map_TCP_connection_block_data_buffer(IP,
port, memory_pool) if this packet is from wired network
    PROCEDURE Client Component (host_index, TCP_index,
        TCP_packet)
```

```
                        -continued else if this packet is from mobile network
        PROCEDURE Server Component (host_index, TCP_index,
            TCP_packet)
    end
END PROCEDURE
```

```
PROCEDURE Capturing Data/ACK from mobile network
    While receiving a packet
        /*determine which TCP block and mobile host control
        block it belongs*/
        if it is a TCP packet
            PROCEDURE Hash table mapping Data/ACK
to
TCP connection of Control block
        else
            PROCEDURE Data/ACK Forwarding queue to
            wired network
END PROCEDURE
```

```
            PROCEDURE Data/ACK Scheduler
While there exists a mobile host control block
            /*using round robin scheduling to select mobile host control block*/
            host_index=select_mobile_host_control_block( );
            /* sending rate burstiness control */
            burstiness_control(host_index);
            /*using round robin scheduling to select TCP control block of selected mobile
host*/
            TCP_index=select_TCP_contorl_block(host_index);
            /* forwarding data packet to the forwarder */
    If the selected TCP control block server component is not in CLOSED state
            If the selected TCP control block has data packet to send
                /*Server component in transmission has 3 phases: NORMAL, FAST_RTX
and TIMEOUT*/
                If the server component phase == NORMAL
                    packet_to_send = next_packet_to_send_pointer;
                    Move the next_packet_to_send_pointer to the next data packet;
                    Put packet_to_send at the tail of data/ACK forwarding queue to
mobile network;
                    packet_unack = packet_unack_pointer //the latest
unacknowledged packet in the data buffer ;
                    if current_time -packet_unack.send_time > retransmission timeout
of this TCP connection
                        Server component enters TIMEOUT phase;
                        next_packet_to_send_pointer = packet_unack_pointer;
                        send_max = packet_to_send_sequence_number +
packet_to_send_packet_length;
                    endif
                else if the server component phase == TIMEOUT
                    packet_to_send = next_packet_to_send_pointer;
                Move the next_packet_to_send_pointer to the next data packet;
                    if packet_to_send_sequence_number < send_max_sequence_number;
                        Put packet_to_send at the tail of data/ACK forwarding
queue to mobile network;
                    else
                        if current_time -packet_unack.send_time >=
retransmission_timeout
                            Server component enters TIMEOUT phase;
                            next_packet_to_send_pointer =
packet_unack_pointer;
                            send_max = packet_to_send_sequence_number +
packet_to_send_packet_length;
                        endif
                    end
                else if the server component phase == FAST_RTX
                    packet_to_send = next_packet_to_send_pointer;
                    Move the next_packet_to_send_pointer to the next data packet;
                    /* the retransmitting packet is lost */
                    if packet_to_send is not in the SACK list
                        Put packet_to_send at the tail of data/ACK forwarding
queue to mobile network;
                    endif
                    packet_unack = packet_unack_pointer; //the latest
```

-continued

```
unacknowledged packet in the data buffer;
                if current_time −packet_unack.send_time > retransmission timeout of this TCP connection
                    Server component enters FAST_RTX phase;
                    next_packet_to_send_pointer = packet_unack_pointer;
                endif
            end
        else if the selected TCP control block has no data packet to send
            packet_unack = packet_unack_pointer;
                if current_time −packet_unack.send_time > retransmission timeout of this TCP connection
                    Server component enters FAST_RTX phase;
                    next_packet_to_send_pointer = packet_unack_pointer;
                    if the server component phase == NORMAL
                        Server component enters TIMEOUT phase;
                        send_max = packet_to_send_sequence_number + packet_to_send_packet_length;
                    else if the server component phase == FAST_RTX
                        Server component is still in FAST_RTX phase;
            end
            next_packet_to_send_pointer = packet_unack_pointer;
                else packet_unack == NULL && client component is in CLOSED state
                    set server component to CLOSED state;
        endif
    end
        else if the selected TCP control block server state and client state are in CLOSED state
            Clean this TCP control block;
                if this Mobile host control block has no TCP control block
                    Clean this Mobile host control block;
            endif
        end
END PROCEDURE
```

```
            PROCEDURE sending rate burst control
        /*INTERVAL is predefined (5ms in implementation), no ACK
            received during INTERVAL*/
            if current_time>last_ack_rcv_time+INTERVAL
                /*bandwidth_estimation module is discussed later*/
                sending_rate=bandwidth_estimation(current_time) ;
END PROCEDURE
```

```
            PROCEDURE host_index=select_mobile_host_control_block
            while there exists mobile host control block
            /*current_sending_rate is the sending rate so far, we want to control the rate to be sending_rate,
                and sending_rate is determined by bandwidth estimation module */
            If current_sending_rate > sending_rate
                continue;
            else
                return host_index;
END PROCEDURE
```

Reference is made to FIG. 7, which diagram illustrates the sliding window average bandwidth estimation of the following procedure.

```
            PROCEDURE Bandwidth Estimation
                (ACK_sequence_number)
        Put ACK_sequence_number into sliding window
            cumul_ack = sliding_window_size( );
            cumul_interval = sliding_window_interval( );
            estimated_bandwidth = (1−μ)*estimate_bandwidth + μ*cumul_ack/cumul_interval;
END PROCEDURE
```

```
            PROCEDURE Sending Rate Adaptation
                (estimated_bandwidth, RTT)
        If RTT > RTT_UPPER // a RTT threshold to trigger bandwidth adaptation
            sending_rate = estimated_bandwidth; // adapt to the estimated bandwidth
        else
            sending_rate = (1−α)*sending_rate_max + α*estimated_bandwidth; // increasing the sending rate aggressively
        end
END PROCEDURE
```

```
            PROCEDURE RTT Estimation
            packet_unack = packet_unack_pointer;
            RTT= (1 − β) * RTT+ β*(current-time − packet_unack.send_time);
            Calculate the RTO using the way in Linux kernel implementation;
END PROCEDURE
```

```
            PROCEDURE Receive_ACK_handler(TCP_packet)
            packet_unack = packet_unack_pointer;
        clean the SACK list if necessary;
        /* we use F-RTO to detect spurious TIMEOUT and prevent the unnecessary retransmission*/
        if server_component_phase == FAST_RTX || client_component_phase == TIMEOUT
            server_component_phase = NORMAL;
        end
        update the packet_unakc_pointer;
            PROCEDURE RTT Estimation;
            PROCEDURE Bandwidth Estimation (packet_unack .ack_sequence_number);
            PROCEDURE Sending Rate Adaptation (estimated_bandwidth, RTT);
END PROCEDURE
```

```
PROCEDURE Local Retransmission (ACK_packet)
    number_duplicate_ACK ++;
    if number_duplicate_ACK == 3
        Server component enters FAST_RTX phase;
            next_packet_to_send_pointer = packet_unack
_pointer;
        endif
END PROCEDURE
```

```
PROCEDURE Server Component (host_index, TCP_index, TCP_packet)
if TCP_packet has SYN flag
    TCP_client_component_state = SYN_SENT;
    TCP_server_component_state = LISTEN;
    Create a TCP_response_packet has SYN+ACK flag;
    Modify the TCP_packet to use large window scale option, the exact value depends on the
data buffer size;
    Put TCP_packet into forwarding queue to wired network;
    Put TCP_response_packet into forwarding queue to mobile network;
else if TCP_packet has RST flag
    TCP_client_component_state = CLOSED;
    TCP_server_component_state = CLOSED;
    Put TCP_packet into forwarding queue to wired network;
Switch TCP_server_component_state:
    Case SYN_REVD: //SYN packet is received
        TCP_server_component_state = ESTABLISEHED;
        TCP_client_component_state = ESTABLISHED;
        if TCP_packet_data_length > 0
            Put TCP_packet into forwarding queue to wired network;
        endif
    Case ESTABLISHED:
        Process the TCP SACK list
        if TCP_packet has FIN flag
            Create an corresponding FIN packet;
            Put FIN packet into the forwarding queue to mobile network;
            PROCEDURE Receive_ACK_handler(TCP_packet);
            if TCP_client_component_state != CLOSED
                Put TCP_packet into the forwarding queue to wired network;
                TCP_client_component_state = FIN_WAIT;
            endif
            TCP_server_component_state = CLOSED;
        else if TCP_packet has data load
            Put TCP_packet into the forwarding queue to wired network;
            Create an corresponding ACK packet;
            Put ACK packet into the forwarding queue to mobile network;
            PROCEDURE Receive_ACK_handler(TCP_packet)
        else if TCP_packet is a cumulative ACK packet
            PROCEDURE Receive_ACK_handler(TCP_packet)
            advertsing_window = data_buffer_availability;
            /*The last sent advertising window is 0 and now data buffer availability is not
empty,
                so we need to notify the other side in wired network we have more space to
store
data packets
            */
            if last_sent_advertising_window == 0 || advertsing_window >= 0.5*data buffer
capacity
                Create a corresponding window update packet;
                Put window update packet into forwarding queue to wired network;
            end
        else if TCP_packet is a duplicated ACK packet
            local_retransmission(TCP_packet);
        end
    end
END PROCEDURE
```

```
PROCEDURE RTT Client Component (host_index,
    TCP_index, TCP_packet)
Switch TCP_client_component_state
    Case SYN_SENT:
        advertising_window = data_buffer_availablity;
        Create an corresponding ACK packet and put it into
forwarding queue to wired network;
        TCP_client_component_state = ESTABLISHED;
```

-continued

```
    Case ESTABLISHED:
        if TCP_packet is a duplicated data packet
            Create an corresponding ACK packet and put it into
forwarding queue to wired network;
        else if TCP_packet is an in-order data packet
            If TCP_packet has FIN flag
                Put TCP_packet into data buffer;
```

-continued

```
            advertising_window = data_buffer_availablity;
            Create an corresponding FIN packet and put it into
forwarding queue to wired network;
            TCP_client_compoent_state = LAST_ACK;
        else
            Put TCP_packet into data buffer;
            advertising_window = data_buffer_availablity;
            Create an corresponding ACK packet and put it into
```

-continued

```
            forwarding queue to wired network;
         End
         else if TCP_packet is a out-of-order data packet
            advertising_window = data_buffer_availablity;
            Create an corresponding ACK packet and put it into
      forwarding queue to wired network;
         end
      Case FIN_WAIT:
         if TCP_packet has FIN flag
            advertising_window = data_buffer_availablity;
            Create an corresponding ACK packet and put it into
      forwarding queue to wired network;
            TCP_client_component_state = CLOSED;
         end
      CASE LAST_ACK:
         TCP_client_componen_state = CLOSED;
      end
END PROCEDURE
```

Performance Evaluation

A software-based implementation of the mobile accelerator described above was developed and tested. Table 2 summarizes the parameters adopted in the experiments.

TABLE 2

Parameters adopted in the experiments.

| | | | Symbol | | |
|---|---|---|---|---|---|
| K | λ | α | β | μ | Rcap |
| Value 250 | 0.2 | 140 ms | 260 ms | 0.8 | 5.6 Mbps for 3G 100 Mbps for LTE |

Performance over 3G/HSPA Network

The experimental setup consisted of a Linux server with kernel 2.6 (with the default TCP Cubic congestion control module), connected via the proposed mobile accelerator (running on Windows XP SP2) to the Internet via a wired network link running at 1 Gbps. The receiver host ran Windows XP SP2 and was connected to the mobile data network via a USB 3G/HSPA modem supporting up to 7.2 Mbps downlink bandwidth. When the mobile accelerator is deactivated the accelerator will simply forward packets to-and-from the server without any processing. All experiments were conducted with the receiving host in a stationary position.

Figure 4:
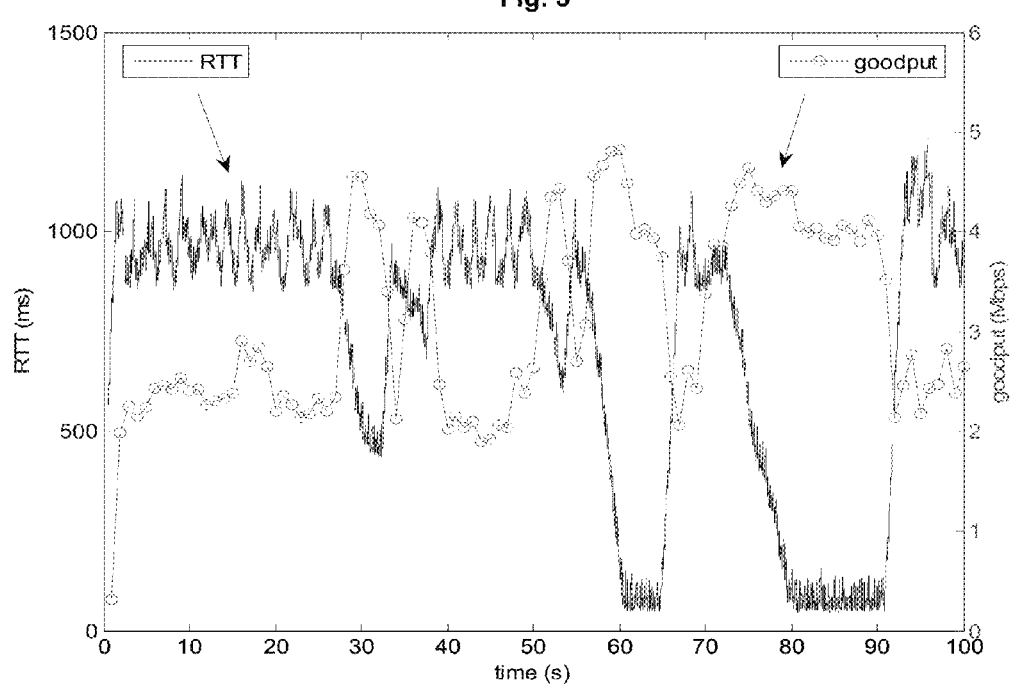
FIG. 4 is a graph illustrating goodput and roundtrip time.

FIG. 4 plots the average TCP throughput in downloading a file ranging from 32 KB to 10 MB from the Apache web server running at the server to the browser running at the client. Three sets of experiments were conducted: (a) non-accelerated TCP with default window size of 17 KB; (b) non-accelerated TCP with the window size manually increased to 64 KB; and (c) accelerated TCP with default window size of 17 KB.

The results show that the mobile accelerator can increase TCP throughput performance significantly. The improvement is most significant for smaller file sizes. This is because the rate-based congestion control algorithm does not suffer from slow ramp-up of the transmission rate, and is more effective in utilizing network bandwidth.

Moreover, even with the default window size of 17 KB, the accelerated TCP can still achieve throughput close to the network's capacity for large file sizes. This demonstrates the effectiveness of the proposed opportunistic transmission scheme in resolving the receiver window size limit.

Performance Over LTE Networks

Long Term Evolution (LTE) [2] is an emerging standard for mobile data networks that can offer downlink peak bandwidth in excess of 100 Mbps. To verify the invention, experiments were conducted on a pre-production LTE network using the same experimental setup as described above.

In the first set of experiments the effort was made to measure the performance characteristics of the LTE network. Specifically, a special application was used to send UDP datagrams at a fixed rate from the Linux server to a notebook equipped with a LTE USB modem. Table 3 summarizes the measured RTT and packet loss rate at sending rate ranging from 1.6 Mbps to 80 Mbps.

TABLE 3

RTT and loss rate over LTE for various data rates.

| | Sending rate (Mbps) | | | | | | |
|---|---|---|---|---|---|---|---|
| | 1.6 | 4.0 | 8 | 16 | 28 | 36 | 40 | 80 |
| Average RTT (ms) | 25 | 34 | 38 | 51 | 66 | 171 | 964 | 1466 |
| Loss ratio (%) | 0.01 | 0.01 | 0.8 | 3.7 | 5.5 | 10.7 | 11.8 | 34.8 |

There are two observations. First, while the RTT is very short at low data rates (e.g., 25 ms at 1.6 Mbps), it begins to increase significantly even at medium data rates (e.g., 171 ms at 36 Mbps). Consequently the resultant bandwidth-delay product will become very large (e.g., at 36 Mbps the BDP is 769.5 KB) and the default TCP window size will be a severe bottleneck to throughput performance. Therefore in the following TCP throughput experiments, normal TCP's receiver window size was manually increased to 1024 KB to mitigate this bottleneck.

Second, the packet loss rate is not insignificant even at low data rates (e.g., 3.7% at 16 Mbps) and increases rapidly with higher data rates. This suggests that the performance of TCP could be severely degraded by the frequent packet losses which trigger congestion control. This is confirmed by our TCP throughput measurements in Table 4. Four sets of experiments were conducted by locating the client computer in different physical locations such that different levels of radio signal quality were obtained. The radio signal quality is measured using two parameters: Reference Signal Receiving Power (RSRP) [2] and Signal to Interference plus Noise Ratio (SINR) [2]. Larger values represent better signal quality in both parameters. In each experiment the client downloaded a 68 MB file via the LTE network from a Linux server.

The results in Table 4 clearly show the performance improvement achieved using the mobile accelerator. For example, at the highest signal quality of {−64,27} the accelerated TCP throughput reached 74 Mbps while normal TCP can only achieve 34 Mbps. Moreover, in each signal condition, UDP flow was also used to measure the maximum goodput achievable. Comparing this to the accelerated TCP throughput one can see that the mobile accelerator can raise the TCP performance close to the network capacity limit, thus efficiently utilizing the large amount of bandwidth available in LTE networks.

TABLE 4

Comparison of TCP throughput performance under different radio signal conditions over LTE.

| | {RSRP, SINR} | | | |
|---|---|---|---|---|
| | {−64, 27} | {−81, 27} | {−90, 27} | {−110, 15} |
| Accelerated TCP throughput (Mbps) | 74 | 73 | 53 | 47 |
| Normal TCP throughput (Mbps) | 34 | 36 | 30 | 27 |
| Maximum UDP goodput (Mbps) | 81 | 80 | 55 | 50 |

CONCLUSION

This disclosure establishes that the conventional wireline oriented transport control protocol (TCP) is far from optimal for use in the emerging high-speed mobile data networks. A mobile accelerator installed in a wireless network and processing TCP traffic according to the invention can effectively resolve both the flow and the congestion control bottlenecks to enable TCP to efficiently utilize the underlying network bandwidth. More importantly, this network-centric approach does not require modification to existing server/client operating systems, nor the network applications, and thus can be readily deployed in today's mobile data networks to accelerate all traversing TCP traffic.

The invention has been explained with reference to specific embodiments. Other embodiments will be evident to those of ordinary skill in the art. It is therefore not intended that this invention be limited, except as indicated by the appended claims.

References cited herein include the following:

[1] The 3$^{rd}$ Generation Partnership Project (3GPP), Available as of Jun. 1, 2011: http://www.3 gpp.org.
[2] M. Allman, V. Paxson and W. Stevens, "TCP Congestion Control," *Request for Comments* 2581, April 1999.
[3] S. Floyd and T. Henderson. "The New Reno Modification to TCP's Fast Recovery Algorithm," *Request for Comments* 2582, April 1999.
[4] S. Ha, I. Rhee and L. Xu, "CUBIC: A New TCP-Friendly High-Speed TCP Variant," *International Workshop on Protocols for Fast and Long Distance Networks*, 2005.
[5] S. Mascolo, C. Casetti, M. Geria, M. Y. Sanadidi and R. Wang, "TCP Westwood: Bandwidth Estimation for Enhanced Transport over Wireless Links," in *Proceedings of ACM SIGMOBILE*, July 2001.
[6] C. Fu, S. Liew, "TCP Veno: TCP Enhancement for Transmission Over Wireless Access Networks," in *IEEE Journal on Selected Areas in Communications*, Vol. 21, 2003.
[7] "Long Term Evolution (LTE): A Technical Overview," Motorola, July 2010.
[8] V. Jacobson, R. Braden and D. Borman, "TCP Extensions for High Performance," *Request for Comments* 1323, May 1992.
[9] Y. B. Lee, T. S. Yum and W. S. Wan, "TCP-Super-Charger: A New Approach to High-Throughput Satellite Data Transfer," in *Proceedings of 27th International Symposium on Space Technology and Science*, Epochal Tsukuba, Tokyo, Japan, July 2009.
[10] H. Balakrishnan, V. Padmanabhan, S. Seshan and R. Katz, "A Comparison of Mechanisms for Improving TCP Performance over Wireless Links," in *Proceedings of IEEE/ACM Transactions on Networking*, Vol. 5, December 1997.

What is claimed is:

1. A method for controlling network traffic congestion in a telecommunication path between a wired segment server employing TCP protocols and a host operating system on a first side and a wireless mobile client employing a client operating system and a mobile client on a second side of the telecommunication path, comprising:
    providing an intermediate accelerator apparatus between the wired segment server and the mobile client device in the telecommunication path without modification to the wired segment server, to the host operating system, to the wireless mobile client and to the client operating system;
    measuring, via the intermediate accelerator apparatus inserted between the wired segment server and the mobile client device, reception timings of packets;
    at the intermediate accelerator apparatus, buffering TCP incoming packets from the wired segment server and immediately returning TCP ACKs to the wired segment server, the TCP ACKs reporting receiver window size according to the buffer availability at the accelerator device rather than the buffer availability of the wireless mobile client;
    controlling packet transmission from the accelerator apparatus to the mobile client irrespective of window size, unless the window size is zero or below a defined threshold, by rate based congestion control, thereby using only the intermediate accelerator apparatus to control packet transmission between the wired segment server and the mobile client.

2. The method according to claim 1 wherein the rate-based congestion control algorithm comprises a bandwidth estimation component and a bandwidth adaptation component, wherein the accelerator apparatus performs an accelerator-to-receiver estimate of the available bandwidth by measuring the timings of returning acknowledgement packets.

3. The method according to claim 2, wherein estimated receiving bandwidth denoted by Ri, is computed from:

$$R_i = \frac{ack_{i+k} - ack_i}{t_{i+k} - t_i}$$

where ti is arrival time of ACK i with acknowledged sequence number acki, integer k is positive, the numerator is the amount of data received by the mobile client during time interval ($t_i$, $t_{i+k}$] such that the parameter k controls the duration of the estimation interval (in number of ACKs) and can be adjusted to tradeoff between accuracy and timeliness of rate estimation.

4. The method according to claim 3 wherein computed $R_i$'s are further smoothed with a smoothing factor by applying exponentially weighted moving averaging to obtain an estimated bandwidth R given by:
    R=(1−λ)×R+λ×$R_i$ where λ is the smoothing factor.

5. The method according to claim 4 wherein bandwidth adaptation is triggered by two RTT thresholds α and β, α<β, and controlled by a transmission rate limit $R_{max}$ such that if measured RTT exceeds β, then the accelerator apparatus triggers congestion avoidance and sets Rmax to the estimated bandwidth R according to the relationship R=(1−λ)×

R+λ×Ri so that if the measured RTT is less than α, then the network is not congested and the accelerator will increase $R_{max}$ according to:

$$R_{max} = \mu \times R_{max} + (1-p) \times R_{cap}$$

where $R_{cap}$ is the link capacity of the mobile data network and where the parameter μ ranges from 0 and 1 and is used to control the rate of transmission rate increase.

6. A device for controlling network traffic congestion in a telecommunication path between a wired segment server employing TCP protocols and a host operating system with a first window size on a first side and a wireless mobile client employing a client operating system and a mobile client with a second window size on a second side of the telecommunication path, comprising:
- an intermediate accelerator apparatus having a processor element and a memory element, the intermediate accelerator apparatus configured for insertion between the wired segment server and the wireless mobile client without modification to the wired segment server, to the host operating system, to the wireless mobile client and to the client operating system for dividing TCP flow between the wired segment server and the mobile client, the intermediate accelerator apparatus being configured for:
- measuring reception timings of packets without impacting configuration of either the wired segment server or the mobile client; and
- buffering TCP incoming packets from the wired segment server and immediately returning TCP ACKs to the wired segment server, the TCP ACKs reporting first window size according to the buffer availability at the accelerator device rather than the buffer availability of the wireless mobile client having the second window size as reported by the wireless mobile client to the intermediate accelerator apparatus, the first window size being greater than the second window size; and
- controlling packet transmission from the accelerator apparatus to the mobile client by rate based congestion control at a rate greater than a rate that the second of window size can accommodate, thereby using only the intermediate accelerator apparatus to control packet transmission rate between the wired segment server and the mobile client.

7. The system according to claim 6 wherein the rate-Based congestion control algorithm comprises a bandwidth estimation component and a bandwidth adaptation component, wherein the accelerator apparatus performs an accelerator-to-receiver estimate of the available bandwidth by measuring the timings of returning acknowledgement packets.

8. The system according to claim 7, wherein estimated receiving bandwidth denoted by Ri, is computed from:

$$R_i = \frac{ack_{i+k} - ack_i}{t_{i+k} - t_i}$$

where ti is arrival time of ACK i with acknowledged sequence number acki, integer k is positive, the numerator is the amount of data received by the mobile client during time interval $(t_i, t_{i+k}]$ such that the parameter k controls the duration of the estimation interval (in number of ACKs) and can be adjusted to tradeoff between accuracy and timeliness of rate estimation.

9. The system according to claim 8 wherein computed $R_i$'s are further smoothed with a smoothing factor by applying exponentially weighted moving averaging to obtain an estimated bandwidth R given by:
R=(1−λ)×R+λ×$R_i$ where λ is the smoothing factor.

10. The system according to claim 9 wherein bandwidth adaptation is triggered by two RTT thresholds α and β, α<β, and controlled by a transmission rate limit $R_{max}$ such that if measured RTT exceeds β, then the accelerator apparatus triggers congestion avoidance and sets Rmax to the estimated bandwidth R according to the relationship R=(1−λ)× R+λ×Ri so that if the measured RTT is less than a, then the network is not congested and the accelerator will increase $R_{max}$ according to:

$$R_{max} = \mu \times R_{max} + (1-p) \times R_{cap}$$

where $R_{cap}$ is the link capacity of the mobile data network and where the parameter p ranges from 0 and 1 and is used to control the rate of transmission rate increase.

* * * * *